Nov. 23, 1971   B. W. WOJTECKI   3,621,862
FLUID METERING DEVICE

Original Filed March 22, 1968

_United States Patent Office_

3,621,862
Patented Nov. 23, 1971

3,621,862
FLUID METERING DEVICE
Boguslaw W. Wojtecki, London, England, assignor to Westinghouse Brake and Signal Company Limited
Continuation-in-part of application Ser. No. 600,799, Dec. 12, 1966, and a continuation of application Ser. No. 715,390, Mar. 22, 1968. This application June 9, 1970, Ser. No. 48,822
Claims priority, application Great Britain, Mar. 30, 1967, 14,571/67
Int. Cl. F15b 5/00; G05d 16/00
U.S. Cl. 137—82                                3 Claims

ABSTRACT OF THE DISCLOSURE

A fluid pressure control valve of which the output pressure is determined by the amount of an input pressure which is dissipated to atmosphere wherein the input pressure is fed through a fluid metering device which maintains a constant pressure difference across a feed choke controlling the flow of air to a converter irrespective of the difference in pressure between supply and outlet.

This results in a much reduced air consumption for zero or low outlet pressures and an evening up of air consumption over the whole range and also an improvement in the linearity of the curve at higher pressure settings.

Variations in the supply pressure normally result in slight varations in output pressure for given converter input conditions. These variations in output pressure are virtually eliminated by the inclusion of this device.

---

This continuation-in-part application specifically incorporates by reference the subject matter disclosed in the parent United States application Ser. No. 600,799, filed Dec. 12, 1966, of which I am one of the joint inventors.

This application is a continuation of my previous application Ser. No. 715,390, filed Mar. 22, 1968.

This invention relates to fluid-pressure control valves.

The present invention provides a fluid-pressure control valve having a fluid flow inlet port between which and a second port is located a fluid metering device having a normally-closed valve located up-stream of a piston having therethrough a choked passage through which only fluid can flow from the up-stream side of the piston to the second port, the piston being resiliently loaded in a direction and by a force of sufficient value as to hold open the normally-closed valve so long only as pressure of fluid on the up-stream side of the piston is insufficient to overcome the resilient loading on the piston, an outlet port, an exhaust port providing a valve seat, a throttling element movable towards and away from the valve seat thereby to effect a varying degree of throttling to the passage of fluid through the valve seat, a cantilever-mounted leaf spring the free end of which is operatively engageable by the throttling element, and loading means by which the free end of the leaf spring can be loaded such that, in operation of the valve, when a fluid pressure of predetermined value pertains at the inlet port, the value of the fluid pressure pertaining at the outlet port is dependent upon the rate of escape of fluid through the valve seat which rate is in turn determined by the degree of throttling effected by the throttling element consequent upon the degree of loading of the leaf spring by said means.

The normally closed valve of the device may have a valve seat and a valve closure member resiliently loaded on the up-stream side of the valve of the device in a direction tending to seat the valve closure member on the valve seat of the device. The valve closure member may have a valve stem passing through the valve seat, which valve stem is engageable by the piston.

One embodiment of the present invention will now be described in greater detail, by way of example only with reference to the accompanying drawings, of which:

Figure 1:
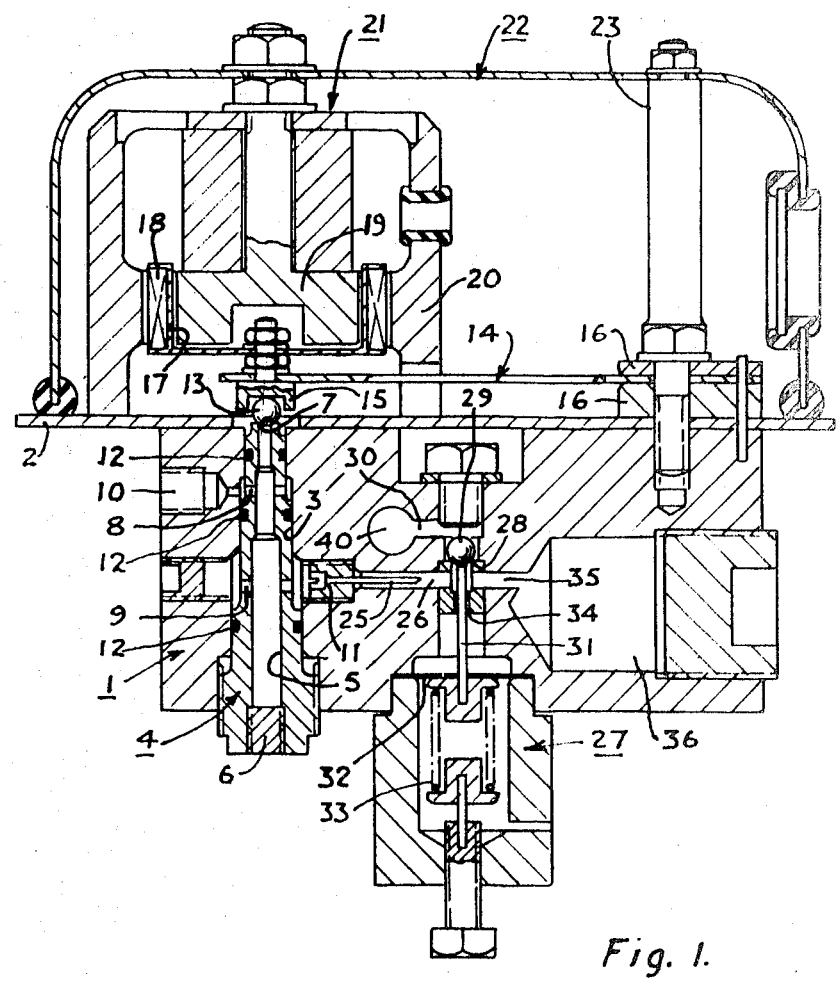
FIG. 1 shows a cross-sectional view of a fluid pressure control valve.

Referring to FIG. 1 of the drawings, the control valve comprises a valve body 1 secured to the underside of a mounting plate 2.

The valve body 1 is provided with a stepped bore 3 within which is axally adjustable a member 4 having therein an axially-extending first conduit 5 sealed at its lower end 6 and providing at its upper end an exhaust port 7 constituting a valve seat. Extending transversely of the conduit 5 are two second conduits 8 and 9 respectively. The conduit 8 communicates with an outlet port 10 and the conduit 9 communicates with an inlet port 11. The member 4 is sealed with respect to the bore 3 by sealing means 12 effective to prevent inter-communication of the ports 7, 10 and 11 except by way of the first conduit 5.

Seated by its own weight on the exhaust port 7 is a throttling element 13 in the form of a ball.

The ball 13 is engageable with the free end of a cantilever-mounted leaf spring 14, through an inversely mounted cup-shaped button 15 which serves loosely to locate the element 13 and which is carried adjacent the free end of the leaf spring 14 which is clamped at its other end between mounting blocks 16 secured to the mounting plate 2.

Co-axially mounted with respect to the button 15 and carried by the leaf spring 14 adjacent its free end thereof, is a light-weight former 17 encircled by an annular armature coil 18 lying between the inner pole 19 and the encircling outer pole 20 of a permanent magnet 21 fixedly located on an enclosing housing 22 secured to the mounting plate 2 by pillars (of which one only is shown) 23.

The inlet port 11 communicates through a choke 25 with an outlet port 26 of a pressure limiting valve 27. The pressure limiting valve 27 comprises a valve seat 28 into and out of engagement with which is a ball-shaped valve closure element 29 lying between the outlet port 26 and an inlet port 30. The valve closure element 29 is arranged for operation by a push rod 31 carried by a diaphragm 32 the under side of which is resiliently loaded by a spring 33 and to the top side of which is applied (through a pasage 34 encircling the push rod 31) the pressure pertaining at the outlet port 26. The outlet port 26 is also connected through a conduit 35, with a volume 36. The inlet port 30 is connected through a passage 40, to a source of supply of fluid under pressure.

The above described control valve operates as follows:

With the passage 40 connected to a source of fluid under pressure, fluid pressure will build-up in the chamber 36 and at the outlet port 26 of the limiting valve 27 until this pressure reaches the limit determined by the setting of the valve 27. At this limit, the downward force on the diaphragm 32 exerted by the pressure of the fluid above the diaphragm 32, will balance the force exerted upwardly on the diaphragm 32 by the spring 33. It will be seen, therefore, that the valve 27 will be effective to control the degree of fluid pressure at the outlet 26 within fine limits.

From the outlet port 26 of the valve 27, fluid under pressure can flow through the choke 25 of the inlet port 11 through the second conduit 9 into the first conduit 5. From the first conduit 5, the fluid under pressure has two paths open to it. It can flow from the first conduit 5 through the second conduit 8 to the outlet port 10 and it can flow from the first conduit 5 through the exhaust port 7 past the throttling element 13. How much of the fluid in the conduit 5 will flow through the exhaust port 7 will depend upon to what degree the passage through the exhaust port 7 is throttled by the throtling element 13. Moreover, the pressure of the fluid at the outlet port 10 will depend upon at what rate fluid is exhausted through the exhaust port 7.

The rate at which fluid is exhausted through the exhaust port 7 will be dependent upon the balancing of the forces acting on the element 13.

Considering, firstly, the case when the coil 18 is de-energised, the forces acting downwardly on the element 13 will be, firstly, the weight of the element 13 and, secondly, the weight of the coil 18, the former 17, the button 15, and a part of the weight of the leaf spring 14. However, from this second force must be substratced the restoring effort of the leaf spring 14 tending to counteract the downward deflection of the leaf spring 14 at its free end due to the weight of the coil 18, the former 17, the button 15 and that part of the weight of the leaf spring 14. Acting upwardly in opposition to this summation of forces will be the force exerted on the element 13 by the pressure of the fluid passing through the port 7.

With the coil 18 de-energised, the member 4 can be set at an axial position in the bore 3 to provide an escape of fluid through the port 7 which is of such a rate that the pressure of fluid at the outlet port 10 is at the required minimum.

If, however, the coil 18 is now energised a further additional force (proportional to the degree of energisation of the coil 18) will be exerted downwardly on the element 13 due to the reaction between the electromagnetic effect resultant upon the energisation of the coil 18, and the effect of the permanent magnet 21. This additional downward force will tend to move the element 13 downwardly further to throttle the port 7. This increase in throttling of the port 7 will, on the one hand, reduce the rate at which fluid is exhausted through the port 7 and, on the other hand, increase the pressure of this exhausting fluid. Increased throttling of the port 7 will continue until once again, there is a balance of forces on the element 13 and this increased throttling of the port 7 will increase the pressure at the outlet port 10.

By suitable choice of proportions between the stiffness of the leaf spring 14, the diameter of the ball element 13 and the diameter of the exhaust port 7, it is possible to obtain (within very close limits) a linear relationship between the current in the coil 18 and the pressure at the outlet port 10.

Theoretically, however much the clearance between the element 13 and the port 7 is increased, the pressure in the outlet port 10 can never be zero. To avoid the necessity of having a large clearance (and consequent possible deviation from linearity of the pressure at the outlet port 10 with respect to the current flowing in the coil 18) it is desirable that the minimum pressure at the outlet port 10 should be about 3 lbs. per sq. inch. As has been explained, this minimum pressure is determined by the axial setting of the member 4 in the bore 3.

Although, as has been stated above, it is theoretically possible to obtain a practically linear relationship between the current flowing in the coil 19 and the pressure at the outlet port 10, production variations between different valves may result in slighly differing characteristics between the valves. These differing characteristics may arise from any one or more of the following:

(a) the coil winding 18 may not be identical from one valve to another.
(b) the magnetic flux between the poles of the permanent magnet 21 may not be the same between valves.
(c) the diameter of the port 7 may vary within manufacturing tolerances.
(d) temperature variations within the coil 18 due either to the fact of current passing through the coil 18 or a change in ambient temperature conditions.

Non-linearity arising from (a), (b) and (c) can be corrected by the addition of a trimmer resistances across the coil 18 and non-linearity (due to (d)) above can be corrected by embodying a thermistor in the coil winding 18.

In the valve shown in FIG. 1, the inlet port 11 is fed through the choke 25 from the outlet port 26 of the pressure limiting valve 27. This arrangement has the disadvantage that when the valve is used for the higher pressure ranges, say of the order of up to 100 p.s.i. output pressure, the linearity at the low pressure end is affected. This is because the ball 13 has to be lifted so far off its seat 7 in the minimum pressure condition that the coefficient of discharge of the orifice no longer varies linearily for linear increments of lift.

One method of overcoming this is to reduce the size of the fixed choke 25 so that less fluid will flow through the valve and consequently less lift of the ball 13 will be necessary. This method cannot, however, be employed where one of the requirements is a limit on the time of build-up of pressure at the outlet port 10 of the valve. Such a limit imposes a minimum size for the fixed choke 25 and this size may be such as to produce the condition of non-linearity described above.

Figure 2:
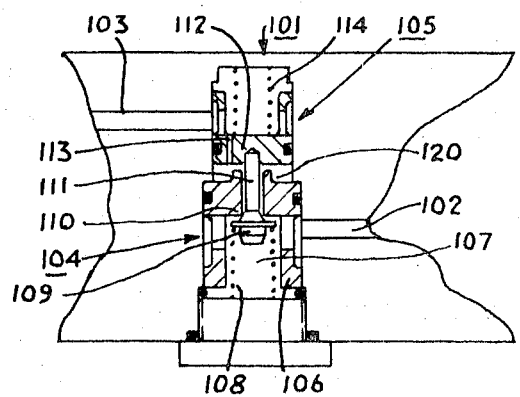
FIG. 2 shows a cross sectional view of the fluid metering device.

To deal with this problem, the fixed choke 25 is replaced by a fluid metering device as shown in FIG. 2.

Referring to FIG. 2, the device 101 is located between an inlet port 102 and an outlet port 103.

The device has a normally-closed valve 104 above which is a piston arrangement 105.

The valve 104 has a valve body 106 the interior chamber 107 of which communicates with the inlet port 102. Within the chamber 107 is a light spring 108 which resiliently urges a valve closure member 109 into engagement with a valve seat 110 in the valve body 106. The valve-closure member 109 has a valve stem 111 which projects through the valve seat 110 so as to be engageable with a piston 112 of the piston arrangement 105.

The piston 112 has therethrough a choked passage 113 by which only fluid can flow from the up-stream side of the piston 112 to the outlet port 103. The piston is resiliently loaded by a spring 114 which exerts on the piston 112 a force sufficient to overcome the spring 108 resiliently loading the valve-closure member 109.

The device above described operates as follows:

Assuming, firstly, that no fluid pressure is present at the inlet port 102, as observed above, the spring 114 exerting a force greater than the spring 108, the valve 104 will be held open by virtue of the valve closure member 109 being held out of engagement with the valve seat 110.

If now fluid pressure is applied at the inlet port 102, this fluid pressure will flow through the open valve 104 into a chamber 120 between the valve 104 and the piston arrangement 105. Pressure in this chamber 120 on the up-stream side of the piston 112 will cause an upward force to be exerted on the piston 112 in opposition to the downward force exerted by the spring 114.

Whilst fluid will flow from the chamber 120 through the choked passage 113 to the outlet port 103, this flow being choked, a pressure will build up in the chamber 120 until the force exerted on the piston 112 is sufficient to overcome the spring 114 whereupon the piston 112 will be moved upwardly by the force exerted by the fluid pressure in the chamber 120. Such upward movement of the piston 112 will allow the valve 104 to be closed by virtue of the valve closure member 109 being moved upwardly to engage the seat 110, by the spring 108.

After such an event, the fluid pressure in the chamber 120 will be dissipated through the choked passage 113 and the outlet port 103 and a stage will be reached at which the pressure in the chamber 120 has reduced to such a value that the force exerted by that pressure upwardly on the piston 112 will be overcome by the force exerted downwardly on the piston 112 by the spring 114.

At this stage, the piston 112 will re-engage the valve stem 111 and the spring 114 will cause the valve closure member 109 to be moved out of engagement with the valve seat 110 against the effort of the spring 108. Consequently, further fluid pressure will flow from the inlet port 102 to the chamber 120.

It will be seen, therefore, that within the limitations of the construction, a predetermined value of fluid pressure will pertain across the choked passage 113 irrespective of the pressure difference between the inlet and outlet ports, resulting in an improved performance and a smaller overall consumption of fluid over the output pressure range, particularly where this range is wide.

The above described device replaces the fixed choke 25 of the valve described with reference to and illustrated in the FIG. 1; the inlet port 102 and the outlet 102 and the outlet port 103 of the above device of FIG. 2 being, respectively, the outlet port 26 of the pressure limiting valve 27 and the restricted fluid flow inlet port 11.

I claim:

1. A fluid pressure control valve having a means for supplying a high pressure fluid supply to a fluid flow inlet port, a fluid metering device between the said inlet port and a second port, said fluid metering device having a normally-closed valve located upstream of a piston having therethrough a choked passage through which only fluid can flow from the upstream side of the piston to the second port, the piston being resiliently loaded in a direction and by a force of sufficient value as to hold open the normally closed valve so long as pressure of fluid on the upstream side of the piston is insufficient to overcome the resilient loading of the piston and the pressure at the second port acting on the downstream side of the piston, an outlet port, an exhaust port providing a valve seat, the second port of said fluid metering device being exposed to the outlet port and the exhaust port, a throttling element movable towards and away from the valve seat thereby to effect a varying degree of throttling to the passage of fluid through the valve seat, a resilient cantilever-mounted leaf spring, the free end of which is operatively engageable by the throttling element and loading means for loading the free end of the leaf spring such that in operation of the valve, when a fluid pressure of predetermined value pertains at the second port, the value of the fluid pressure pertaining at the outlet port is dependent upon the rate of escape of fluid through the valve seat of the exhaust port, which rate is in turn determined by the degree of throttling effected by the throttling element consequent upon the degree of loading of the leaf spring by said means, the mass of air flowing through the metering device to the outlet and exhaust ports thus varying in dependence upon the position of the throttling element and hence upon the pressure downstream of the second port of the metering device relative to the valve seat.

2. A fluid pressure control valve according to claim 1, wherein the normally-closed valve of the fluid metering device has a valve seat and a valve closure member resiliently loaded on the upstream side of the valve of the device in a direction tending to seat the valve closure member on the valve seat of the device.

3. A fluid pressure control valve according to claim 2, wherein the valve closure member has a valve stem passing through the valve seat, which valve stem is engageable by the pistons.

References Cited
UNITED STATES PATENTS

| | | | |
|---|---|---|---|
| 3,125,109 | 3/1964 | Kreuter | 137—82 |
| 3,447,555 | 6/1969 | Jenney | 137—82 |
| 316,626 | 4/1885 | Jackson | 137—501 X |
| 2,623,331 | 12/1952 | Greening | 137—501 |
| 2,960,097 | 11/1960 | Scheffler | 137—82 |
| 2,964,051 | 12/1960 | Garnett | 137—85 |
| 3,237,633 | 3/1966 | Sanville | 137—82 |

ALAN COHAN, Primary Examiner

U.S. Cl. X.R.

137—501